United States Patent
Yang et al.

(10) Patent No.: US 12,536,553 B2
(45) Date of Patent: Jan. 27, 2026

(54) ENERGY MARKET TRADING STRATEGY CONSIDERING CARBON EMISSIONS AND GREEN CERTIFICATES

(71) Applicant: Anhui University, Hefei (CN)

(72) Inventors: Lingxiao Yang, Hefei (CN); Ning Zhang, Hefei (CN); Cungang Hu, Hefei (CN); Juan Yan, Hefei (CN); Wenjie Zhu, Hefei (CN); Tao Rui, Hefei (CN); Jin Zhang, Hefei (CN); Bi Liu, Hefei (CN); Haoran Li, Hefei (CN); Yutong Cao, Hefei (CN)

(73) Assignee: Anhui University, Hefei (CN)

( * ) Notice: Subject to any disclaimer, the term of this patent is extended or adjusted under 35 U.S.C. 154(b) by 0 days.

(21) Appl. No.: 19/002,435

(22) Filed: Dec. 26, 2024

(65) Prior Publication Data

US 2025/0390891 A1 Dec. 25, 2025

(30) Foreign Application Priority Data

Jun. 20, 2024 (CN) .......................... 202410799149.4

(51) Int. Cl.
*G06Q 30/01* (2023.01)
*G06Q 30/018* (2023.01)
*G06Q 40/04* (2012.01)

(52) U.S. Cl.
CPC ........... *G06Q 30/018* (2013.01); *G06Q 40/04* (2013.01)

(58) Field of Classification Search
CPC .............................. G06Q 30/018; G06Q 40/04
See application file for complete search history.

(56) References Cited

U.S. PATENT DOCUMENTS

2013/0332327 A1* 12/2013 Sgouridis ............... G06Q 40/04
705/37

FOREIGN PATENT DOCUMENTS

AU          2021106252 A       11/2021
AU          2022201721 A1 *    10/2022    ......... G06F 16/2393
(Continued)

OTHER PUBLICATIONS

Zhou et al.: Carbon Cost Pass-Through Analysis Considering Green Certificate Trading, 8th Asia Conference on Power and Electronic Engineering ACPEE), 2023, pp. 1-5 (Year: 2023).*

(Continued)

*Primary Examiner* — Bijendra K Shrestha
(74) *Attorney, Agent, or Firm* — Hawaii Patent Services; Nathaniel K. Fedde; Kenton N. Fedde

(57) ABSTRACT

An electricity-carbon-green certificate market transaction method based on chaotic mapping considering carbon capturing, comprising: building a transaction strategy for describing the interaction of the market entities in a multi-element market, the multi-element market comprises an electricity market, a carbon market and a green certificate market; and building an upper-layer electricity-carbon-green certificate multi-market combined transaction model considering carbon emission settlement based on the transaction strategy. With the method proposed in the present invention, the model is built according to the energy transaction flow existing in among the transaction entities, efficient utilization of renewable energies and low carbon emissions can be realized, national requirement on low carbonization of market transaction can be satisfied, and a multi-element market transaction mechanism that complies with the dual-carbon target is provided for the existing energy transaction market.

2 Claims, 1 Drawing Sheet

(56) References Cited

FOREIGN PATENT DOCUMENTS

Figure 1:
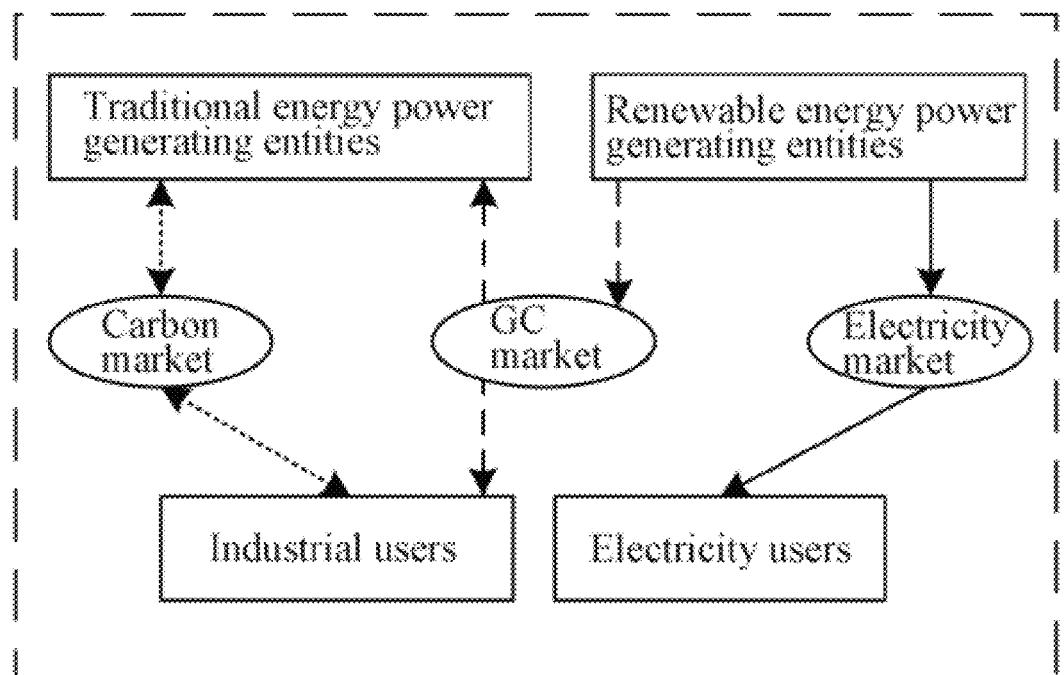

| CN | 110956344 | A | * | 4/2020 | ............. G06Q 50/06 |
| CN | 115115458 | A | * | 9/2022 | ............. G06Q 40/04 |
| CN | 115392564 | A | * | 11/2022 | ............. G06Q 10/04 |
| CN | 116404676 | A | * | 7/2023 | ............. H02J 3/144 |
| CN | 116646979 | A | * | 8/2023 | |
| CN | 116911428 | A | | 10/2023 | |
| CN | 117495214 | A | * | 2/2024 | ........... G06Q 10/067 |
| CN | 117933445 | A | | 4/2024 | |
| CN | 117933648 | A | | 4/2024 | |
| CN | 118074107 | A | | 5/2024 | |
| EP | 3444771 | A1 | * | 2/2019 | ........... G06Q 30/018 |

OTHER PUBLICATIONS

Qin et al.: Operation Optimization of Integrated Energy System based on Carbon Trading—Green Certficate Trading Mechanism, 2022, IEEE, pp. 1-6 (Year: 2022).*

Yingjie Xue et al; Optimized dispatch of wind power system considering green card-carbon mechanism. Journal of Taiyuan University of Technology, vol. 49, issue 5. Sep. 30, 2018. pp. 785-192.

* cited by examiner

ENERGY MARKET TRADING STRATEGY CONSIDERING CARBON EMISSIONS AND GREEN CERTIFICATES

INCORPORATION BY REFERENCE

This application claims the benefit of priority from China Patent Application No. 2024107991494 filed on Jun. 20, 2024, the contents of which are hereby incorporated by reference in their entirety.

TECHNICAL FIELD

The present invention relates to the technical field of multi-market combined trading modeling, especially an electricity-carbon-green certificate market transaction method based on chaotic mapping considering carbon capturing.

BACKGROUND TECHNOLOGY

Low carbonization and clean energy is a development direction of the power industry in China, a rational market operation mechanism is a basis for promoting the Chinese power industry to be a cleaner, more efficient and low carbon industry, with mutual transaction of the power market, the carbon market and the green certificate market, development of the low carbon economy in China can be realized, however, there is still some problem with interaction between the carbon market, the power market and the green certificate market in China, specifically, the interaction is single market or dual-market based, due to the lack of a reasonable transaction mechanism, it is difficult to realize tri-market combined transaction:

(1) It is difficult to represent the interaction relationship between the three markets;
(2) The transaction processes of the users are complex and it is difficult to promise low carbon transaction between the users; and
(3) The system operation is diversified, and a rational mechanism is required to realize multi-market transaction.

SUMMARY OF THE INVENTION

In view of the deficiency of the prior art, the present invention provides an electricity-carbon-green certificate market transaction method based on chaotic mapping considering carbon capturing, to address the technical problem that it is difficult to realize combined transaction due to the lack of reasonable transaction mechanism among the carbon market, the electricity market and the green certificate market.

To address the foregoing problem, the present invention provides the following technical solution: an electricity-carbon-green certificate market transaction method based on chaotic mapping considering carbon capturing, comprising:

S1: building a transaction strategy for describing interaction of market entities in a multi-element market, and the multi-element market comprises an electricity market, a carbon market and a green certificate market;
S2: building an upper-layer electricity-carbon-green certificate multi-market combined transaction model considering carbon emission settlement based on the transaction strategy;
S3: building a lower layer electricity-carbon-green certificate multi-market combined clearing model considering neutralizing of some carbon emissions by carbon capturing based on transaction features of each of the market entities;
S4: building transaction restraint conditions for the electricity-carbon-green certificate multi-market combined transaction model considering neutralizing of some carbon emissions by carbon capturing based on the electricity-carbon-green certificate multi-market combined clearing model; and
S5: introducing chaotic Sine mapping improved particle swarm optimization targeting at maximizing of a low carbon economy and solving the electricity-carbon-green certificate multi-market combined transaction model considering neutralizing of carbon emissions by carbon capturing.

Further, in the step S1, the market entities comprise renewable energy power generating entities, conventional energy power generating entities and users, wherein the users comprise power consumers and industrial users;

The transaction strategy comprises:

The renewable energy power generating entities can sell electricity and green certificates; conventional energy power generating entities can sell electricity and carbon quota, and can buy the green certificates and the carbon quota; meanwhile, some carbon emissions can be neutralized by carbon capturing; the power consumers can buy electricity and the green certificates; and the industrial users can buy the green certificates and the carbon quota; Wherein, the green certificates can be used as the carbon quota to counteract the carbon emissions to realize low carbon transaction of the multi-element market.

Further, the step S2 comprises:

S21: designing a transaction strategy for the electricity market, including benefits of the renewable energy power generating entities participating in the electricity market and benefits of the conventional energy power generating entities participating in the electricity market;
S22: designing a transaction strategy for the green certificate market, including benefits of the renewable energy power generating entities participating in the green certificate market and expenses of the conventional energy power generating entities participating in the green certificate market;
S23: designing a transaction strategy for the carbon market, represented by:

$$E_{quota} = \alpha_{carbon} Q_{trade} - \lambda_{carbon} B_p$$

In the foregoing equation, $E_{quota}$ is a carbon transaction benefit; $\alpha_{carbon}$ is carbon quota price; $Q_{trade}$ is a carbon quota transaction amount; $\lambda_{carbon}$ is a market settlement price; and $B_p$ is a market carbon emission settlement amount;

S24: building an electricity-carbon-green certificate multi-market combined transaction model with optimal economic efficiency according to the transaction strategy of the electricity market, the transaction strategy of the green certificate market and the transaction strategy of the carbon market, wherein an equation is given:

$$\max(E_{elc}^{RE} + E_{elc}^{TR} + E_{sub} - C_{tr} + E_{quota})$$

In the foregoing equation, $$E_{elc}^{RE}$$

represents benefits of the renewable energy power generating selling the electricity;

$$E_{elc}^{TR}$$

represents benefits of the traditional energy power generating entities by selling the electricity; $E_{sub}$ represents benefits of the renewable energy power generating entities by selling the green certificates; $C_{tr}$ represents expenses of the traditional energy power generating entities in participating the green certificate market and $E_{quota}$ represents carbon transaction benefits.

Further, the benefits of the renewable energy power generating entities participating in the electricity market are represented as:

$$E_{elc}^{RE} = \sum_{t \in T} \sum_{i \in \Omega_r} \alpha_{elc,t} P_{e,sell,t}^{RE,i} \Delta t$$

The benefits of the traditional energy power generating entities in participating in the electricity market are represented as:

$$E_{elc}^{TR} = \sum_{t \in T} \sum_{i \in \Omega_t} \alpha_{elc,t} P_{e,sell,t}^{TR,i} \Delta t$$

In the foregoing equation, $$E_{elc}^{RE}$$

stands for the benefits of the renewable energy power generating entities by selling the electricity; $\Omega_r$ stands for renewable energy power generating units; $\alpha_{elc,t}$ is electricity market price;

$$P_{e,sell,t}^{RE,i}$$

is an output contributed by the electricity sold by a renewable energy power generating unit i at a time t; $\Delta t$ is an output time;

$$E_{elc}^{TR}$$

is a benefit of the renewable energy power generating entities by selling the electricity;

$$P_{e,sell,t}^{TR,i}$$

is an output contributed by the electricity sold by a traditional energy power generating unit i at a time t; $\Omega_t$ is a traditional energy power generating unit; and T is a market transaction period;

The benefits of the renewable energy power generating entities in participating in the green certificate market are represented as:

$$L_{obt} = \sum_{t \in T} \sum_{i \in \Omega_r} P_{e,t}^{RE,i} \Delta t$$

$$E_{sub} = \sum_{i \in \Omega_r} \alpha_{GCER} L_{sell,i}$$

The expenses of the traditional energy power generating entities in participating the green certificate market are shown as:

$$C_{tr} = \sum_{i \in \Omega_r} \alpha_{GCER} L_{buy,i}$$

In the foregoing equation, $L_{obt}$ is a number of the green certificates obtained by the output of renewable energies;

$$P_{e,t}^{RE,i}$$

is an output power of the renewable energy power generating unit i at a time t; $E_{sub}$ is a benefit of the renewable energy power generating entities selling the green certificates; $\alpha_{GCER}$ is green certificate price; $L_{sell,i}$ is a number of the green certificates that the renewable energy power generating unit i sold; $C_{tr}$ is an expense of the traditional energy power generating entities in participating in the green certificate market; and $L_{buy,i}$ is a number of the green certificates those the traditional energy power generating entities buy.

Further, in the step S3, the transaction features of the market entities comprise: clearing the carbon emissions in a commodity exchange market, the carbon emissions those are not transacted are deemed as excess carbon emissions to be taken as a carbon emission settlement amount, establishing a carbon emission penalty mechanism considering carbon capturing, punishing the carbon emissions those are not transacted, and an expression of the electricity-carbon-green certificate multi-market combined clearing model is:

$$B_{capture} + Q_{Carbon} - B_{Carbon} + Q_{trade} + \theta L_{buy,i} = B_p$$

$$B_{Carbon} = \sum_{t \in T} \sum_{i \in \Omega_t} \theta \cdot P_{e,t}^{TR,i} \cdot \Delta t$$

$$B_{capture} = \beta \cdot B_{Carbon}$$

$$\theta = \mu \times \gamma \times (1 - \beta) \times \frac{M_{CO_2}}{M_C} \times \chi$$

$$\chi_i = \frac{[a(P_{e,t}^{TR,i})^2 + bP_{e,t}^{TR,i} + c]\gamma}{P_{e,t}^{TR,i}}$$

In the foregoing equation, $B_{Carbon}$ represents actual carbon emission; $B_{capture}$ represents actual carbon captures; $Q_{Carbon}$ represents free carbon quota; $Q_{trade}$ represents a carbon quota transaction amount; $B_p$ is a market carbon emission settlement amount; θ represents unit output carbon emission strength;

$$P_{e,t}^{TR,i}$$

represents an output power or the traditional energy generating unit i at the time t; β represents a carbon capture rate; Δt represents output time; μ represents carbon contents of coal for the power generating units; γ represents a carbon oxidation rate; $M_{CO_2}$ represents a mole mass of carbon dioxide; $M_C$ represents a mole mass of carbon; $\chi_i$ represents coal consumption per kilowatt-hour of the power generating units; a, b, c represent respectively coal consumption feature parameters of the coal power units in regular operation status; γ' represents a rectification parameter, where the power units are working normally, γ'=1, where the power units are stopped, γ'=0.

Further, in the step S4, the transaction restraint conditions comprise restraints on participating in transaction of the electricity market, restraints on participating in transaction of the green certificate market, restraints on participating in transaction of the carbon market, and restraints on multi-market clearing, respectively:

To ensure that the transaction electricity amount does not exceed the generated electricity amount, building the restraints on participating in the electricity market as follows:

$$0 \le P_{e,sell,t}^{RE,i} \le P_{e,t}^{RE,i}$$
$$0 \le P_{e,sell,t}^{TR,i} \le P_{e,t}^{TR,i}$$

To ensure that the number of the transaction green certificates do not go beyond the number of the obtainable green certificates, building the restraint on participating in the green certificate transaction as following:

$$0 \le L_{buy,i} \le P_{e,t}^{TR,i}\Delta t$$
$$0 \le L_{sell,i} \le P_{e,t}^{RE,i}\Delta t$$

Building the restraints on participating in carbon market transaction as a market settlement amount cannot be negative, a carbon capture rate and a carbon oxidation rate shall fall into 0~1, expressed as following:

$$0 \le B_P$$
$$0 \le \beta \le 1$$
$$0 \le \gamma \le 1$$

The restraints on multi-market settlement are as following:

$$\begin{cases} B_{Carbon} - B_{capture} - Q_{Carbon} > 0, & Q_{trade} > 0, & L_{buy,i} > 0 \\ B_{Carbon} - B_{capture} - Q_{Carbon} = 0, & Q_{trade} = 0, & L_{buy,i} = 0 \\ B_{Carbon} - B_{capture} - Q_{Carbon} < 0, & Q_{trade} < 0, & L_{buy,i} = 0 \end{cases}$$

In the foregoing equation, $$P_{e,sell,t}^{RE,i}$$

represents the output corresponding to the electricity contributed by the renewable energy power generating unit i at the time t;

$$P_{e,t}^{RE,i}$$

represents the power output by the renewable energy power generating unit i at the time t;

$$P_{e,sell,t}^{TR,i}$$

is the output of the electricity sold by the traditional energy power generating unit i at the time t;

$$P_{e,t}^{TR,i}$$

represents the power output by the traditional energy power generating unit i at the time t; $L_{buy,i}$ is a number of the green certificates bought by the traditional energy power generating entities; $L_{sell,i}$ is a number of the green certificates sold by the renewable energy power generating unit i; $B_p$ is a market carbon emission settlement amount; β is a carbon capture rate; γ is carbon oxidation rate; $B_{Carbon}$ represents actual carbon emissions; $B_{capture}$ represents the carbon capture amount; $Q_{Carbon}$ represents free carbon quota; and $Q_{trade}$ represents the transaction amount of the carbon quota.

Further, the step S5 comprises specifically:

S51: establishing the optimal value function U based on a mapping relationship between the upper-layer decision variables and lower-layer target functions, and the mapping relationship is represented as follows:

$$U = \pi(x) = \min_y \{f(x, y): g_p(x, y), p = 1, \ldots P\}$$

Wherein, U is the optimal value function; π(•) is a mapping function; in the electricity-carbon-green certificate multi-market combined transaction model, an input by the optimal value function in the lower-layer model comprises power generation curves of the power generating entities, an output is the market carbon settlement amount, shown as $U=\pi(p_i)$, $p_i$ is parameter information of the power generation curves of the power generation entities;

S52: establishing approximate construction of the function based on a polynomial expression, and solving coefficients by the least square algorithm;

S53: converting the double-layer model to be a single-layer model via KKT conditions, and the single-layer model can be shown as:

$$\max(E_{elc}^{RE} + E_{elc}^{TR} + E_{sub} - C_{tr} + E_{quota})$$

-continued $$\lambda_{carbon}(B_{capture} + Q_{Carbon} - B_{Carbon} + Q_{trade} + \theta L_{buy,i}) - \alpha_{carbon} Q_{trade} \leq$$
$$\pi_T^*(P_i), \forall\, T\overline{\omega}_{(n,i\in\Psi_N^S),T} = \pi_{n,T}^*(P_i), \forall\, n, T$$

Wherein, $$E_{elc}^{RE}$$

represents benefits of the renewable energy power generating entities by selling the electricity;

$$E_{elc}^{TR}$$

shows benefits of the traditional energy power generating entities by selling the electricity; $E_{sub}$ represents benefits of the renewable energy power generating entities by selling the green certificates; $C_{tr}$ represents expenses of the traditional energy power generating entities in participating in the green certificate market; $E_{quota}$ represents carbon transaction benefits; $\lambda_{carbon}$ represents market settlement price; $B_{Carbon}$ represents actual carbon emissions; $B_{capture}$ represents the carbon capture amount; $Q_{Carbon}$ represents free carbon quota; $Q_{trade}$ represents the carbon quota transaction amount; $\theta$ represents unit output carbon emission strength; $L_{buy,i}$ is the number of the green certificates those the traditional energy power generating entities buy; a carbon represents carbon quota price;

$$\pi_{n,T}^*(P_i)$$

represents an approximate value of the carbon emission settlement amount of a node n at the time t;

$$\overline{\omega}_{(n:i\in\Psi_n^s),T}$$

is the carbon emission settlement amount of the node n at the time T; and $$\pi_T^*(p_i)$$

represents a minimum value of the negative benefits of the carbon market;
S54: solving the optimal problem of the low carbon economy by improved particle swarm optimization.
Further, the step S52 comprises specifically:
S521: representing the optimal value function U as linear combinations of a polynomial based function regarding an input variable $p_i$, specifically:

$$U \approx \pi^*(p_i) = \sum_{l\in\Re} d_l \phi_l(p_i)$$

$$\Re = \{\phi_l(p_i)\}_{l=1}^{N_s}$$

$$= \left\{ \{\phi_{k_1}^1\}_{k_1=0}^{N_c} \otimes \ldots \otimes \{\phi_{k_M}^M\}_{k_M=0}^{N_c} \,\bigg|\, \sum_{u=1}^M k_u \leq N_c \right\}$$

In the equation, $\pi^*(p_i)$ is an approximate value of the optimal value function U, l is a serial number of the polynomial basis functions; $d_l$ is a coefficient of the lth polynomial base function; $\phi_l(p_i)$ is the lth polynomial basis function; $\Re$ is a set formed by all the polynomial basis functions; $N_s$ is a number of the polynomial basis function; $N_c$ is a highest order of the basis functions; M is a dimension of the input variable $p_i$; and u is a serial number of the dimension of the input variable $p_i$; $k_u$ is an order number of the basis function formed by the uth dimensional component of the input variable $p_i$, falling in a range of 0~$N_c$; $\otimes$ is a tensor product of an operator;

$$\phi_{k_M}^M$$

is a $k_M$ order basis function formed by the Mth dimensional component of the input variable $p_i$;
S522: selecting a zero point of a higher order polynomial basis function as a sampling point, a number of the sampling points is $N=(1+N_c)^M$, wherein N is a total number of the sampling points; M is a dimension of the input variable $p_i$;
S523: substituting the sampling points and corresponding value function observed values in linear combinations of the polynomial basis function $$U \approx \pi^*(p_i) = \sum_{l\in\Re} d_l \phi_l(p_i)$$

and obtaining a regression equation of the coefficient $d_l$, shown as:

$$\begin{bmatrix} \phi_{1,1} & \phi_{1,2} & \cdots & \phi_{1,N_s} \\ \phi_{2,1} & \phi_{2,2} & \cdots & \phi_{2,N_s} \\ \vdots & \vdots & & \vdots \\ \phi_{N,1} & \phi_{N,2} & \cdots & \phi_{N,N_s} \end{bmatrix} \begin{bmatrix} d_1 \\ d_2 \\ \vdots \\ d_{N_s} \end{bmatrix} = \begin{bmatrix} \pi_1 \\ \pi_2 \\ \vdots \\ \pi_{N_s} \end{bmatrix}$$

In the equation, $\phi_{N,N_s}$ is a value of the Nth sampling point of the $N_s$th polynomial basis function; $d_{N_s}$ is a coefficient of the $N_s$th polynomial basis function; and $\pi^N$ is a value function observed value of the approximate value $\pi(p_i)$ at the Nth sampling point;
S524: solving the unknown coefficient $d_l$ of the polynomial basis function by the least square algorithm, which is:

$$D = (\Phi^T \Phi)^{-1} \Phi^T \Psi$$

In the equation, D is a matrix formed by the unknown coefficient $d_l$; $\Phi$ is a matrix formed by the polynomial basis function $\phi_{N,N_s}$; $\Psi$ is a matrix formed by the value function observed values $\pi^N$.
Further, the step S54 comprises:
S541: setting basic parameters of the algorithm, initiating positions and velocities of particles; introducing chaotic Sine mapping to build a non-linear stochastic ascending inertia weight, and the improved inertia weight is expressed as:

$$\begin{cases} \omega^k = S(k) \times \omega_{min} + (\omega_{max} - \omega_{min})\dfrac{k}{k_{max}} \\ S(k) = \mu \times \sin(S(k-1) \times \pi),\ S(0) = rand,\ \mu \in (0, 1] \end{cases}$$

In the equation, k is the current iteration number; $k_{max}$ is the maximum iteration number, setting $k_{max}=200$; $\omega^k$, is a weight value at the kth iteration; $\omega_{max}$ and $\omega_{min}$ are an upper threshold and a lower threshold of the inertia weight, respectively 0.9 and 0.4; and S(k) is chaotic Sine mapping;

S542: calculating fitness values of the particles according to a given function $$F = E_{elc}^{RE} + E_{elc}^{TR} + E_{sub} - C_{tr} + E_{quota}$$

and storing individual optimal positions and global optimal positions;

Subsequently, comparing the fitness values of all the particles in the swarm and the fitness values of the experienced optimal positions, if the former is better, replacing the experienced individual optimal position of the particles with the current positions of the particles;

S543: renewing the positions and the velocities of the particles, modifying the positions of the particles again according to the restraint conditions, calculating the fitness values of the particles, recording and renewing the individual optimal positions and global optimal positions;

$$v_{id}(t+1) = \omega^k v_{id}(t) + c_1 r_1(pbest_{id} - x_{id}(t)) + c_2 r_2(gbest_d - x_{id}(t))$$

$$x_{id}(t+1) = x_{id}(t) + v_{id}(t+1)$$

In the equation, $v_{id}$(t+1) and $x_{id}$(t+1) are respectively the velocities and positions of the particle I at the t+1 iteration; $c_1$ and $c_2$ are learning factors, $c_1=c_2=2$; $r_1$ and $r_2$ are random numbers distributed evenly in a range of [0, 1]; $\omega^k$ is a weight at the kth iteration; $pbest_{id}$ comprises extreme values of the current particle i; $gbest_d$ is a current global optimal solution; and $x_{id}$ is a position of the particle I at the tth iteration;

S544: repeating steps S541 to S543 until reaching the iteration number, the algorithm is converged, and solving is done.

With the foregoing technical solution, the present invention provides an electricity-carbon-green certificate market transaction method based on chaotic mapping considering carbon capturing, there are the following beneficial effects:

1. With the method proposed in the present invention, the model is built based on the energy transaction flow existing in among the transaction entities, in this way, highly efficient utilization of the renewable energies and low carbon emissions can be realized, national requirements on low carbon market transaction can be satisfied, and a multi-element market transaction mechanism that complies with the dual-carbon target is provided for the existing energy transaction market.

2. In the present invention, a novel operation solution is provided for the current commodity market by providing the electricity-carbon-green certificate transaction strategy based on chaotic mapping considering carbon capture, on the premise of single market individual transaction, multi-market combined transaction of the electricity market, the carbon market and the green certificate market, by combined transaction of the electricity-carbon-green certificate market, low carbon economic operation of the market is achieved.

BRIEF INTRODUCTION OF DRAWINGS

Figure 2:
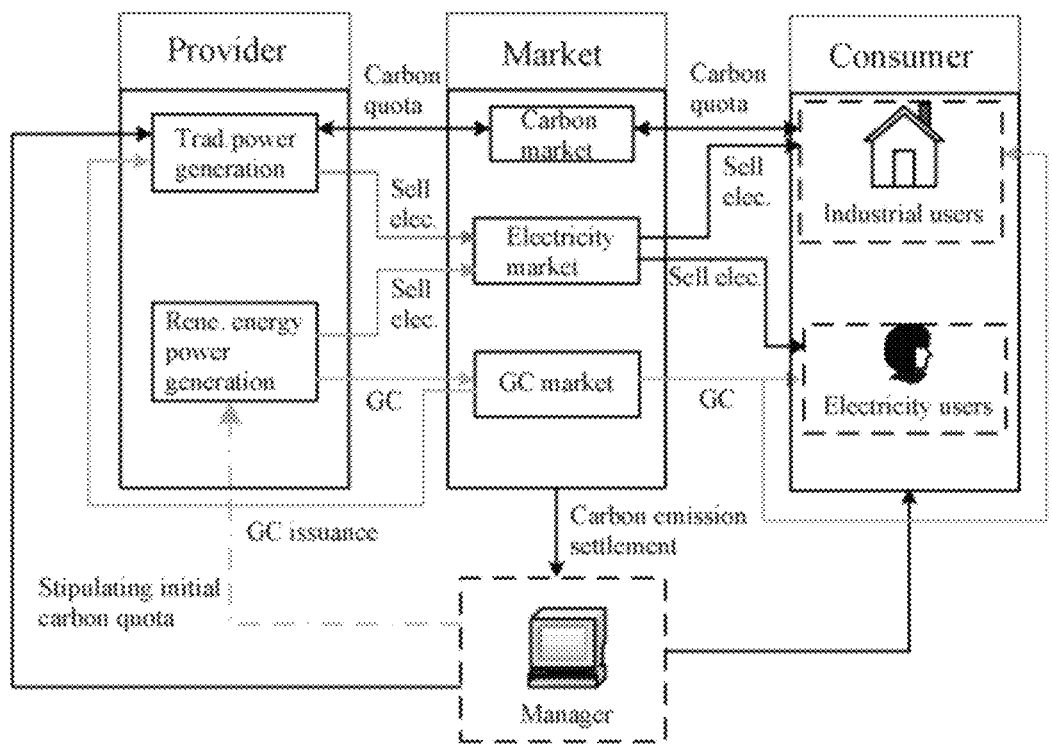

The drawings are provided for further understanding of the present invention, shall be construed a part of the present invention, and the exemplary embodiments and explanation thereof are intended to explain the present invention without forming improper limitation of the present invention. In the drawings:

FIG. 1 is a schematic diagram showing interaction between the electricity market, the green certificate market and the carbon market; and FIG. 2 is a schematic diagram showing electricity-carbon-green certificate combined clearing mechanism according to the present invention.

EMBODIMENTS

To make the purpose, features and advantages of the present invention more obvious and apparent, hereinafter, a further detailed explanation will be made to the present invention in conjunction with the drawings and the embodiments. In this way, the process how the present invention solves the technical problem and reaches the technical benefits can be fully understood and implemented.

With reference to FIGS. 1-2, in the present embodiment, an electricity-carbon-green certificate market transaction method based on chaotic mapping considering carbon capture is proposed, wherein the model is built according to the energy transaction flow existing in among the transaction entities, efficient utilization of the renewable energies and low carbon emission can be realized, national requirements on market transaction low carbonization can be satisfied, a multi-element transaction mechanism that complies with the dual-carbon target is provided for the existing energy transaction market, a low carbon market transaction mechanism of the green certificates is designed and low carbon transaction of multiple market can be realized. The method comprises the following steps:

S1: building a transaction strategy for describing interaction of market entities in a multi-element market, and the multi-element market comprises an electricity market, a carbon market and a green certificate market; wherein the market entities comprise renewable energy power generating entities, conventional energy power generating entities and users, wherein the users comprise power consumers and industrial users;

The renewable energy power generating entities can sell electricity and green certificates; conventional energy power generating entities can sell electricity and carbon quota, and can buy the green certificates and the carbon quota; meanwhile, some carbon emissions can be neutralized by carbon capturing; the power consumers can buy electricity and the green certificates; and the industrial users can buy the green certificates and the carbon quota; Wherein, the green certificates can be used as the carbon quota to counteract the carbon emissions to realize low carbon transaction of the multi-element market as shown in FIG. 1.

S2: building an upper-layer electricity-carbon-green certificate multi-market combined transaction model considering carbon emission settlement based on the transaction strategy; the step S2 comprises specifically the following steps:

S21: designing a transaction strategy for the electricity market, including benefits of the renewable energy power generating entities participating in the electricity market and benefits of the conventional energy power generating entities participating in the electricity market; Wherein the benefits of the renewable energy power generating entities participating in the electricity market are represented as:

$$E_{elc}^{RE} = \sum_{t \in T} \sum_{i \in \Omega_r} \alpha_{elc,t} P_{e,sell,t}^{RE,i} \Delta t$$

The benefits of the traditional energy power generating entities in participating in the electricity market are represented as:

$$E_{elc}^{TR} = \sum_{t \in T} \sum_{i \in \Omega_t} \alpha_{elc,t} P_{e,sell,t}^{TR,i} \Delta t$$

In the foregoing equation, $$E_{elc}^{RE}$$

stands for the benefits of the renewable energy power generating entities by selling the electricity; $\Omega_r$ stands for renewable energy power generating units; $\alpha_{elc,t}$ is electricity market price;

$$P_{e,sell,t}^{RE,i}$$

is an output contributed by the electricity sold by a renewable energy power generating unit i at a time t; $\Delta t$ is an output time;

$$E_{elc}^{TR}$$

is a benefit of the renewable energy power generating entities by selling the electricity;

$$P_{e,sell,t}^{TR,i}$$

is an output contributed by the electricity sold by a traditional energy power generating unit i at a time t; $\Omega_t$ is a traditional energy power generating unit; and T is a market transaction period;

S22: designing a transaction strategy for the green certificate market, including benefits of the renewable energy power generating entities participating in the green certificate market and expenses of the conventional energy power generating entities participating in the green certificate market;

Wherein, the benefits of the renewable energy power generating entities in participating in the green certificate market are represented as:

$$L_{obt} = \sum_{t \in T} \sum_{i \in \Omega_r} P_{e,t}^{RE,i} \Delta t$$

$$E_{sub} = \sum_{i \in \Omega_r} \alpha_{GCER} L_{sell,i}$$

The expenses of the traditional energy power generating entities in participating the green certificate market are shown as:

$$C_{tr} = \sum_{i \in \Omega_r} \alpha_{GCER} L_{buy,i}$$

In the foregoing equation, $L_{obt}$ is a number of the green certificates obtained by the output of renewable energies;

$$P_{e,t}^{RE,i}$$

is an output power of the renewable energy power generating unit i at a time t; $E_{sub}$ is a benefit of the renewable energy power generating entities selling the green certificates; $\alpha_{GCER}$ is green certificate price; $L_{sell,i}$ is a number of the green certificates that the renewable energy power generating unit i sold; $C_{tr}$ is an expense of the traditional energy power generating entities in participating in the green certificate market; and $L_{buy,i}$ is a number of the green certificates those the traditional energy power generating entities buy.

S23: designing a transaction strategy for the carbon market, represented by:

$$E_{quota} = \alpha_{carbon} Q_{trade} - \lambda_{carbon} B_p$$

In the foregoing equation, $E_{quota}$ is a carbon transaction benefit; $\alpha_{carbon}$ is carbon quota price; $Q_{trade}$ is a carbon quota transaction amount; $\lambda_{carbon}$ is a market settlement price; and $B_p$ is a market carbon emission settlement amount;

S24: building an electricity-carbon-green certificate multi-market combined transaction model with optimal economic efficiency according to the transaction strategy of the electricity market, the transaction strategy of the green certificate market and the transaction strategy of the carbon market, wherein an equation is given:

$$\max \left( E_{elc}^{RE} + E_{elc}^{TR} + E_{sub} - C_{tr} + E_{quota} \right)$$

In the foregoing equation, $$E_{elc}^{RE}$$

represents benefits of the renewable energy power generating entities by selling the electricity;

$$E_{elc}^{TR}$$

represents benefits of the traditional energy power generating entities by selling the electricity; $E_{sub}$ represents benefits of the renewable energy power generating entities by selling the green certificates; $C_{tr}$ represents expenses of the traditional energy power generating entities in participating the green certificate market and $E_{quota}$ represents carbon transaction benefits.

S3: building a lower layer electricity-carbon-green certificate multi-market combined clearing model considering neutralizing of some carbon emissions by carbon capturing based on transaction features of each of the market entities; the transaction features of the market entities comprise: clearing the carbon emissions in a commodity exchange market, the carbon emissions those are not transacted are deemed as excess carbon emissions to be taken as a carbon emission settlement amount, establishing a carbon emission penalty mechanism considering carbon capturing, punishing the carbon emissions those are not transacted in order to promote transaction activities of the commodity market as shown in FIG. 2. And an expression of the electricity-carbon-green certificate multi-market combined clearing model is:

$$B_{capture} + Q_{Carbon} - B_{Carbon} + Q_{trade} + \theta L_{buy,i} = B_p$$

$$B_{Carbon} = \sum_{t \in T} \sum_{i \in \Omega_t} \theta \cdot P_{e,t}^{TR,i} \cdot \Delta t$$

$$B_{capture} = \beta \cdot B_{Carbon}$$

$$\theta = \mu \times \gamma \times (1-\beta) \times \frac{M_{CO_2}}{M_C} \times \chi$$

$$\chi_i = \frac{\left[a\left(P_{e,t}^{TR,i}\right)^2 + bP_{e,t}^{TR,i} + c\right]\gamma'}{P_{e,t}^{TR,i}}$$

In the foregoing equation, $B_{Carbon}$ represents actual carbon emission; $B_{capture}$ represents actual carbon captures; $Q_{Carbon}$ represents free carbon quota; $Q_{trade}$ represents a carbon quota transaction amount; $B_p$ is a market carbon emission settlement amount; $\theta$ represents unit output carbon emission strength;

$$P_{e,t}^{TR,i}$$

represents an output power of the traditional energy generating unit i at the time t; $\beta$ represents a carbon capture rate; $\Delta t$ represents output time; $\mu$ represents carbon contents of coal for the power generating units; $\gamma$ represents a carbon oxidation rate; $M_{CO_2}$ represents a mole mass of carbon dioxide; $M_C$ represents a mole mass of carbon; $\chi_i$ represents coal consumption per kilowatt-hour of the power generating units; a, b, c represent respectively coal consumption feature parameters of the coal power units in regular operation status; $\gamma'$ represents a rectification parameter, where the power units are working normally, $\gamma'=1$, where the power units are stopped, $\gamma'=0$.

S4: building transaction restraint conditions for the electricity-carbon-green certificate multi-market combined transaction model considering neutralizing of some carbon emissions by carbon capturing based on the electricity-carbon-green certificate multi-market combined clearing model; the transaction restraint conditions comprise restraints on participating in transaction of the electricity market, restraints on participating in transaction of the green certificate market, restraints on participating in transaction of the carbon market, and restraints on multi-market clearing, respectively:

To ensure that the transaction electricity amount does not exceed the generated electricity amount, building the restraints on participating in the electricity market as follows:

$$0 \leq P_{e,sell,t}^{RE,i} \leq P_{e,t}^{RE,i}$$

$$0 \leq P_{e,sell,t}^{TR,i} \leq P_{e,t}^{TR,i}$$

To ensure that the number of the transaction green certificates do not go beyond the number of the obtainable green certificates, building the restraint on participating in the green certificate transaction as following:

$$0 \leq L_{buy,i} \leq P_{e,t}^{TR,i} \Delta t$$

$$0 \leq L_{sell,i} \leq P_{e,t}^{RE,i} \Delta t$$

Building the restraints on participating in carbon market transaction as a market settlement amount cannot be negative, a carbon capture rate and a carbon oxidation rate shall fall into 0~1, expressed as following:

$$0 \leq B_P$$

$$0 \leq \beta \leq 1$$

$$0 \leq \gamma \leq 1$$

The restraints on multi-market settlement are as following:

$$\begin{cases} B_{Carbon} - B_{capture} - Q_{Carbon} > 0, Q_{trade} > 0, L_{buy,i} > 0 \\ B_{Carbon} - B_{capture} - Q_{Carbon} = 0, Q_{trade} = 0, L_{buy,i} = 0 \\ B_{Carbon} - B_{capture} - Q_{Carbon} < 0, Q_{trade} < 0, L_{buy,i} = 0 \end{cases}$$

In the foregoing equation, $$P_{e,sell,t}^{RE,i}$$

represents the output corresponding to the electricity contributed by the renewable energy power generating unit i at the time t;

$$P_{e,t}^{RE,i}$$

represents the power output by the renewable energy power generating unit i at the time t;

$$P_{e,sell,t}^{TR,i}$$

is the output of the electricity sold by the traditional energy power generating unit i at the time t;

$$P_{e,t}^{TR,i}$$

represents the power output by the traditional energy power generating unit i at the time t; $L_{buy,i}$ is a number of the green certificates bought by the traditional energy power generating entities; $L_{sell,i}$ is a number of the green certificates sold by the renewable energy power generating unit i; $B_p$ is a market carbon emission settlement amount; $\beta$ is a carbon capture rate; $\gamma$ is carbon oxidation rate; $B_{Carbon}$ represents actual carbon emissions; $B_{capture}$ represents the carbon capture amount; $Q_{Carbon}$ represents free carbon quota; and $Q_{trade}$ represents the transaction amount of the carbon quota.

S5: introducing chaotic Sine mapping improved particle swarm optimization targeting at maximizing of a low carbon economy and solving the electricity-carbon-green certificate multi-market combined transaction model considering neutralizing of carbon emissions by carbon capturing, comprising specifically:

the step S5 comprises specifically:

S51: establishing the optimal value function U based on a mapping relationship between the upper-layer decision variables and lower-layer target functions, and the mapping relationship is represented as follows:

$$U = \pi(x) = \min_y \{f(x, y): g_p(x, y), p = 1, \ldots P\}$$

Wherein, U is the optimal value function; $\pi(\cdot)$ is a mapping function; in the electricity-carbon-green certificate multi-market combined transaction model, an input by the optimal value function in the lower-layer model comprises power generation curves of the power generating entities, an output is the market carbon settlement amount, shown as $U=\pi(p_i)$, $p_i$ is parameter information of the power generation curves of the power generation entities;

S52: establishing approximate construction of the function based on a polynomial expression, and solving coefficients by the least square algorithm; the step S52 comprises specifically:

S521: representing the optimal value function U as linear combinations of a polynomial based function regarding an input variable $p_i$, specifically:

$$U \approx \pi^*(p_i) = \sum_{l \in \mathfrak{R}} d_l \phi_l(p_i)$$

$$\mathfrak{R} = \{\phi_l(p_i)\}_{l=1}^{N_s}$$

$$= \left\{ \{\phi_{k_1}^1\}_{k_1=0}^{N_c} \otimes \ldots \otimes \{\phi_{k_M}^M\}_{k_M=0}^{N_c} \left| \sum_{u=1}^{M} k_u \leq N_c \right. \right\}$$

In the equation, $\pi^*(p_i)$ is an approximate value of the optimal value function U, l is a serial number of the polynomial basis functions; $d_l$ is a coefficient of the lth polynomial base function; $\phi_l(p_i)$ is the lth polynomial basis function; $\mathfrak{R}$ is a set formed by all the polynomial basis functions; $N_s$ is a number of the polynomial basis function; $N_c$ is a highest order of the basis functions; M is a dimension of the input variable $p_i$; and u is a serial number of the dimension of the input variable $p_i$; $k_u$ is an order number of the basis function formed by the uth dimensional component of the input variable $p_i$, falling in a range of 0~$N_c$; $\otimes$ is a tensor product of an operator;

$$\phi_{k_M}^M$$

is a $k_M$ order basis function formed by the Mth dimensional component of the input variable $p_i$;

S522: selecting a zero point of a higher order polynomial basis function as a sampling point, a number of the sampling points is $N=(1+N_c)^M$, wherein N is a total number of the sampling points; M is a dimension of the input variable $p_i$;

S523: substituting the sampling points and corresponding value function observed values in linear combinations of the polynomial basis function $$U \approx \pi^*(p_i) = \sum_{l \in \mathfrak{R}} d_l \phi_l(p_i)$$

and obtaining a regression equation of the coefficient $d_l$, shown as:

$$\begin{bmatrix} \phi_{1,1} & \phi_{1,2} & \cdots & \phi_{1,N_s} \\ \phi_{2,1} & \phi_{2,2} & \cdots & \phi_{2,N_s} \\ \vdots & \vdots & & \vdots \\ \phi_{N,1} & \phi_{N,2} & \cdots & \phi_{N,N_s} \end{bmatrix} \begin{bmatrix} d_1 \\ d_2 \\ \vdots \\ d_{N_s} \end{bmatrix} = \begin{bmatrix} \pi_1 \\ \pi_2 \\ \vdots \\ \pi_{N_s} \end{bmatrix}$$

In the equation, $\phi_{N,N_s}$ is a value of the Nth sampling point of the $N_s$th polynomial basis function; $d_{N_s}$ is a coefficient of the $N_s$th polynomial basis function; and $\pi^N$ is a value function observed value of the approximate value $\pi(p_i)$ at the Nth sampling point;

S524: solving the unknown coefficient $d_l$ of the polynomial basis function by the least square algorithm, which is:

$$D = (\Phi^T \Phi)^{-1} \Phi^T \Psi$$

In the equation, D is a matrix formed by the unknown coefficient $d_l$; $\Phi$ is a matrix formed by the polynomial basis function $\phi_{N,N_s}$; $\Phi$ is a matrix formed by the value function observed values $\pi^N$.

S53: converting the double-layer model to be a single-layer model via KKT conditions, and the single-layer model can be shown as:

$$\max(E_{elc}^{RE} + E_{elc}^{TR} + E_{sub} - C_{tr} + E_{quota})$$

$$\lambda_{carbon}(B_{capture} + Q_{Carbon} - B_{Carbon} + Q_{trade} + \theta L_{buy,i}) - \alpha_{carbon} Q_{trade} \leq$$

-continued
$$\pi_T^*(P_i), \forall T\varpi_{(n,i\in\Psi_N^S),T} = \pi_{n,T}^*(P_i), \forall n, T$$

Wherein, $$E_{elc}^{RE}$$

represents benefits of the renewable energy power generating entities by selling the electricity;

$$E_{elc}^{TR}$$

shows benefits of the traditional energy power generating entities by selling the electricity; $E_{sub}$ represents benefits of the renewable energy power generating entities by selling the green certificates; $C_{tr}$ represents expenses of the traditional energy power generating entities in participating in the green certificate market; $E_{quota}$ represents carbon transaction benefits; $\lambda_{carbon}$ represents market settlement price; $B_{Carbon}$ represents actual carbon emissions; $B_{capture}$ represents the carbon capture amount; $Q_{Carbon}$ represents free carbon quota; $Q_{trade}$ represents the carbon quota transaction amount; $\theta$ represents unit output carbon emission strength; $L_{buy,i}$ is the number of the green certificates those the traditional energy power generating entities buy; $\alpha_{carbon}$ represents carbon quota price;

$$\pi_{n,T}^*(P_i)$$

represents an approximate value of the carbon emission settlement amount of a node n at the time t;

$$\varpi_{(n:i\in\Psi_n^S),T}$$

is the carbon emission settlement amount of the node n at the time T; and $$\pi_T^*(p_i)$$

represents a minimum value of the negative benefits of the carbon market;

S54: solving the optimal problem of the low carbon economy by improved particle swarm optimization. Specifically, the step S4 comprises the following steps:

S541: setting basic parameters of the algorithm, initiating positions and velocities of particles; introducing chaotic Sine mapping to build a non-linear stochastic ascending inertia weight, and the improved inertia weight is expressed as:

$$\begin{cases} \omega^k = S(k) \times \omega_{min} + (\omega_{max} - \omega_{min})\dfrac{k}{k_{max}} \\ S(k) = \mu \times \sin(S(k-1) \times \pi), S(0) = rand, \mu \in (0, 1] \end{cases}$$

In the equation, k is the current iteration number; $k_{max}$ is the maximum iteration number, setting $k_{max}$=200; $\omega^k$ is a weight value at the kth iteration; $\omega_{max}$ and $\omega_{min}$ are an upper threshold and a lower threshold of the inertia weight, respectively 0.9 and 0.4; and S(k) is chaotic Sine mapping;

S542: calculating fitness values of the particles according to a given function $$F = E_{elc}^{RE} + E_{elc}^{TR} + E_{sub} - C_{tr} + E_{quota}$$

and storing individual optimal positions and global optimal positions;

Subsequently, comparing the fitness values of all the particles in the swarm and the fitness values of the experienced optimal positions, if the former is better, replacing the experienced individual optimal position of the particles with the current positions of the particles;

S543: renewing the positions and the velocities of the particles, modifying the positions of the particles again according to the restraint conditions, calculating the fitness values of the particles, recording and renewing the individual optimal positions and global optimal positions;

$$v_{id}(t+1) = \omega^k v_{id}(t) + c_1 r_1(pbest_{id} - x_{id}(t)) + c_2 r_2(gbest_d - x_{id}(t))$$
$$x_{id}(t+1) = x_{id}(t) + v_{id}(t+1)$$

In the equation, $v_{id}(t+1)$ and $x_{id}(t+1)$ are respectively the velocities and positions of the particle I at the t+1 iteration; $c_1$ and $c_2$ are learning factors, $c_1=c_2=2$; $r_1$ and $r_2$ are random numbers distributed evenly in a range of [0, 1]; $\omega^k$ is a weight at the kth iteration; $pbest_{id}$ comprises extreme values of the current particle i; $gbest_d$ is a current global optimal solution; and $x_{id}$ is a position of the particle I at the tth iteration;

S544: repeating steps S541 to S543 until reaching the iteration number, the algorithm is converged, and solving is done.

In the present invention, a novel operation solution is provided for the existing commodity market with the electricity-carbon-green certificate market transaction strategy based on chaotic mapping considering carbon capturing, on the basis of single market independent transaction, combined transactions of the electricity market, the carbon market and the green certificate market is considered, by combined transaction of the electricity-carbon-green certificate market, low carbon economic operation of the markets is realized.

Those of ordinary skill in the art can understand that some or all steps of the method embodiment can be implemented by instructing the corresponding hardware with a program, therefore, the present invention can be implemented in the form of complete hardware, complete software, or hardware and software combined. Further, the present invention can be carried out by way of a computer program product run in a computer usable storage medium containing one or more computer readable program codes (including but not limited to magnetic memories, CD-ROM, optical memories etc.).

The present invention is introduced in detail with the foregoing embodiment, in the present invention, specific examples are used to explain the principle and embodiments of the present invention, explanation of the foregoing embodiments is only to help understanding the method and core idea of the present invention; in the meanwhile, for those of ordinary skill in the art, modifications can be made to the embodiments and application thereof, above all, the present description shall not be construed as limitations on the present invention.

The invention claimed is:

1. A non-transitory storage medium, storing an electricity-carbon-green certificate market transaction method based on chaotic mapping considering carbon capturing, wherein the method comprising:

S1: building a transaction strategy for describing interaction of market entities in a multi-element market, and the multi-element market comprises an electricity market, a carbon market and a green certificate market;

S2: building an upper-layer electricity-carbon-green certificate multi-market combined transaction model considering carbon emission settlement based on the transaction strategy;

S3: building a lower layer electricity-carbon-green certificate multi-market combined clearing model considering neutralizing of some carbon emissions by carbon capturing based on transaction features of each of the market entities;

S4: building transaction restraint conditions for the electricity-carbon-green certificate multi-market combined transaction model considering neutralizing of some carbon emissions by carbon capturing based on the electricity-carbon-green certificate multi-market combined clearing model; and S5: introducing chaotic Sine mapping improved particle swarm optimization targeting at maximizing of a low carbon economy and solving the electricity-carbon-green certificate multi-market combined transaction model considering neutralizing of some of carbon emissions by carbon capturing; wherein the step S2 comprises:

S21: designing a transaction strategy for the electricity market, including benefits of the renewable energy power generating entities participating in the electricity market and benefits of the conventional energy power generating entities participating in the electricity market;

S22: designing a transaction strategy for the green certificate market, including benefits of the renewable energy power generating entities participating in the green certificate market and expenses of the conventional energy power generating entities participating in the green certificate market;

S23: designing a transaction strategy for the carbon market, represented by:

$$E_{quota} = \alpha_{carbon} Q_{trade} - \lambda_{carbon} B_p$$

in the foregoing equation, $E_{quota}$ is a carbon transaction benefit; $\alpha_{carbon}$ is carbon quota price; $Q_{trade}$ is a carbon quota transaction amount; $\lambda_{carbon}$ is a market settlement price; and $B_p$ is a market carbon emission settlement amount;

S24: building an electricity-carbon-green certificate multi-market combined transaction model with optimal economic efficiency according to the transaction strategy of the electricity market, the transaction strategy of the green certificate market and the transaction strategy of the carbon market, wherein an equation is given:

$$\max \left( E_{elc}^{RE} + E_{elc}^{TR} + E_{sub} - C_{tr} + E_{quota} \right)$$

in the foregoing equation, $$E_{elc}^{RE}$$

represents the benefits of the renewable energy power generating entities by participating in the electricity market;

$$E_{elc}^{TR}$$

represents benefits of the traditional energy power generating entities by participating in the electricity market; $E_{sub}$ represents benefits of the renewable energy power generating entities by selling the green certificates; $C_{tr}$ represents expenses of the traditional energy power generating entities in participating the green certificate market and $E_{quota}$ represents carbon transaction benefits; wherein in the step S3, the transaction features of the market entities comprise: clearing the carbon emissions in a commodity exchange market, the carbon emissions those are not transacted are deemed as excess carbon emissions to be taken as a carbon emission settlement amount, establishing a carbon emission penalty mechanism considering carbon capturing, punishing the carbon emissions those are not transacted, and an expression of the electricity-carbon-green certificate multi-market combined clearing model is:

$$B_{capture} + Q_{Carbon} - B_{Carbon} + Q_{trade} + \theta L_{buy,i} = B_p$$

$$B_{Carbon} = \sum_{t \in T} \sum_{i \in \Omega_t} \theta \cdot P_{e,t}^{TR,i} \cdot \Delta t$$

$$B_{capture} = \beta \cdot B_{Carbon}$$

$$\theta = \mu \times \gamma \times (1 - \beta) \times \frac{M_{CO_2}}{M_C} \times \chi$$

$$\chi_i = \frac{\left[ a(P_{e,t}^{TR,i})^2 + b P_{e,t}^{TR,i} + c \right] \gamma}{P_{e,t}^{TR,i}}$$

in the foregoing equation, $B_{Carbon}$ represents actual carbon emission; $B_{capture}$ represents actual carbon captures; $Q_{Carbon}$ represents free carbon quota; $Q_{trade}$ represents a carbon quota transaction amount; $B_p$ is a market carbon emission settlement amount; $\theta$ represents unit output carbon emission strength;

$$P_{e,t}^{TR,i}$$

represents an output power of the traditional energy generating unit i at the time t; $\beta$ represents a carbon capture rate; $\Delta t$ represents output time; $\mu$ represents carbon contents of coal for the power generating units; $\gamma$ represents a carbon oxidation rate; $M_{CO_2}$ represents a mole mass of carbon dioxide; $M_C$ represents a mole mass of carbon; $\chi_i$ represents coal consumption per kilowatt-hour of the power generating units; a, b, c represent respectively coal consumption feature parameters of the coal power units in regular operation status; $\gamma'$ represents a rectification parameter, where the power units are working normally, $\gamma'=1$, where the power units are stopped, $\gamma'=0$;

wherein in the step S4, the transaction restraint conditions comprise restraints on participating in transaction of the electricity market, restraints on participating in transaction of the green certificate market, restraints on participating in transaction of the carbon market, and restraints on multi-market clearing, respectively:

building the restraints on participating in the electricity market as follows:

$$0 \le P_{e,sell,t}^{RE,i} \le P_{e,t}^{RE,i}$$
$$0 \le P_{e,sell,t}^{TR,i} \le P_{e,t}^{TR,i}$$

building the restraint on participating in the green certificate transaction as following:

$$0 \le L_{buy,i} \le P_{e,t}^{TR,i} \Delta t$$
$$0 \le L_{sell,i} \le P_{e,t}^{RE,i} \Delta t$$

building the restraints on participating in carbon market transaction as a market settlement amount is not negative, a carbon capture rate and a carbon oxidation rate fall into 0~1, expressed as following:

$$0 \le B_P$$
$$0 \le \beta \le 1$$
$$0 \le \gamma \le 1$$

the restraints on multi-market settlement are as following:

$$\begin{cases} B_{Carbon} - B_{capture} - Q_{Carbon} > 0, Q_{trade} > 0, L_{buy,i} > 0 \\ B_{Carbon} - B_{capture} - Q_{Carbon} = 0, Q_{trade} = 0, L_{buy,i} = 0 \\ B_{Carbon} - B_{capture} - Q_{Carbon} < 0, Q_{trade} < 0, L_{buy,i} = 0 \end{cases}$$

$$P_{e,sell,t}^{RE,i}$$

represents the output corresponding to the in the foregoing equation, electricity contributed by the renewable energy power generating unit i at the time t;

$$P_{e,t}^{RE,i}$$

represents the power output by the renewable energy power generating unit i at the time t;

$$P_{e,sell,t}^{TR,i}$$

is the output of the electricity sold by the traditional energy power generating unit i at the time t;

$$P_{e,t}^{TR,i}$$

represents the power output by the traditional energy power generating unit i at the time t; $L_{buy,i}$ is a number of the green certificates bought by the traditional energy power generating entities; $L_{sell,i}$ is a number of the green certificates sold by the renewable energy power generating unit i; $B_p$ is a market carbon emission settlement amount; $\beta$ is a carbon capture rate; $\gamma$ is carbon oxidation rate; $B_{Carbon}$ represents actual carbon emissions; $B_{capture}$ represents the carbon capture amount; $Q_{Carbon}$ represents free carbon quota; $L_{buy,i}$ is a number of green certificates those the traditional energy power generating entities; $\Omega_t$ represents the traditional energy power generating entities; T is a commercial transaction cycle; $\Delta t$ is the output time; and $Q_{trade}$ represents the transaction amount of the carbon quota;

wherein the step S5 comprises specifically:

S51: establishing the optimal value function U based on a mapping relationship between the upper-layer decision variables and lower-layer target functions, and the mapping relationship is represented as follows:

$$U = \pi(x) = \min_y \{f(x, y): g_p(x, y), p = 1, \ldots P\}$$

wherein, U is the optimal value function; $\pi(\cdot)$ is a mapping function; in the electricity-carbon-green certificate multi-market combined transaction model, an input by the optimal value function in the lower-layer model comprises power generation curves of the power generating entities, an output is the market carbon settlement amount, shown as $U=\pi(p_i)$, $p_i$ is parameter information of the power generation curves of the power generation entities;

S52: establishing approximate construction of the function based on a polynomial expression, and solving coefficients by the least square algorithm;

S53: converting the double-layer model to be a single-layer model via KKT conditions, and the single-layer model is shown as:

$$\max(E_{elc}^{RE} + E_{elc}^{TR} + E_{sub} - C_{tr} + E_{quota})$$
$$\lambda_{carbon}(B_{capture} + Q_{Carbon} - B_{Carbon} + Q_{trade} + \theta L_{buy,i}) - \alpha_{carbon} Q_{trade} \le$$
$$\pi_T^*(P_i), \forall T\omega_{(n,i\in\Psi_N^S),T} = \pi_{n,T}^*(P_i), \forall n, T$$

wherein, $$E_{elc}^{RE}$$

represents benefits of the renewable energy power generating entities by selling the electricity;

$$E_{elc}^{TR}$$

shows benefits of the traditional energy power generating entities by selling the electricity; $E_{sub}$ represents benefits of the renewable energy power generating entities by selling the green certificates; $C_{tr}$ represents expenses of the traditional energy power generating entities in participating in the green certificate market; $E_{quota}$ represents carbon transaction benefits; $\lambda_{carbon}$ represents market settlement price; $B_{Carbon}$ represents actual carbon emissions; $B_{capture}$ represents the carbon capture amount; Carbon represents free carbon quota; $Q_{trade}$ represents the carbon quota transaction amount; θ represents unit output carbon emission strength; $L_{buy,i}$ is the number of the green certificates those the traditional energy power generating entities buy; $\alpha_{carbon}$ represents carbon quota price;

$$\pi_{n,T}^*(P_i)$$

represents an approximate value of the carbon emission settlement amount of a node n at the time t;

$$\varpi_{(n:i\in\Psi_n^S),T}$$

is the carbon emission settlement amount of the node n at the time T; and $$\pi_T^*(p_i)$$

represents a minimum value of the negative benefits of the carbon market;

S54: solving the optimal problem of the low carbon economy by improved particle swarm optimization;
wherein the step S52 comprises specifically:
S521: representing the optimal value function U as linear combinations of a polynomial based function regarding an input variable $p_i$, specifically:

$$U \approx \pi^*(p_i) = \sum_{l\in R} d_l \phi_l(p_i)$$

$$\mathfrak{R} = \{\phi_l(p_i)\}_{l=1}^{N_s}$$

$$= \left\{\{\phi_{k_1}^1\}_{k_1=0}^{N_c} \otimes \ldots \otimes \{\phi_{k_M}^M\}_{k_M=0}^{N_c} \,\middle|\, \sum_{u=1}^{M} k_u \leq N_c\right\}$$

in the equation, $\pi^*(p_i)$ is an approximate value of the optimal value function U, l is a serial number of the polynomial basis functions; $d_l$ is a coefficient of the lth polynomial base function; $\phi_l(p_i)$ is the lth polynomial basis function; $\mathfrak{R}$ is a set formed by all the polynomial basis functions; $N_s$ is a number of the polynomial basis function; $N_c$ is a highest order of the basis functions; M is a dimension of the input variable $p_i$; and u is a serial number of the dimension of the input variable $p_i$, $k_u$ is an order number of the basis function formed by the uth dimensional component of the input variable $p_i$, falling in a range of $0\sim N_c$; $\otimes$ is a tensor product of an operator;

$$\phi_{k_M}^M$$

is a $k_M$ order basis function formed by the Mth dimensional component of the input variable $p_i$;

S522: selecting a zero point of a higher order polynomial basis function as a sampling point, a number of the sampling points is $N=(1+N_c)^M$, wherein N is a total number of the sampling points; M is a dimension of the input variable $p_i$;

S523: substituting the sampling points and corresponding value function observed values in linear combinations of the polynomial basis function $$U \approx \pi^*(p_i) = \sum_{l\in R} d_l \phi_l(p_i)$$

and obtaining a regression equation of the coefficient $d_l$, shown as:

$$\begin{bmatrix} \phi_{1,1} & \phi_{1,2} & \cdots & \phi_{1,N_s} \\ \phi_{2,1} & \phi_{2,2} & \cdots & \phi_{2,N_s} \\ \vdots & \vdots & & \vdots \\ \phi_{N,1} & \phi_{N,2} & \cdots & \phi_{N,N_s} \end{bmatrix} \begin{bmatrix} d_1 \\ d_2 \\ \vdots \\ d_{N_s} \end{bmatrix} = \begin{bmatrix} \pi_1 \\ \pi_2 \\ \vdots \\ \pi_{N_s} \end{bmatrix}$$

in the equation, $\phi_{N,N_s}$ is a value of the Nth sampling point of the $N_s$th polynomial basis function; $d_{N_s}$ is a coefficient of the $N_s$th polynomial basis function; and $\pi_{N_s}$ is a value function observed value of the approximate value $\pi(p_i)$ at the Nth sampling point;

S524: solving the unknown coefficient $d_l$ of the polynomial basis function by the least square algorithm, which is:

$$D = (\Phi^T \Phi)^{-1} \Phi^T \Psi$$

in the equation, D is a matrix formed by the unknown coefficient, $d_l$; $\Phi$ is a matrix formed by the polynomial basis function $\phi_{N,N_s}$; $\Psi$ is a matrix formed by the value function observed values $\pi_{N_s}$;

wherein the step S54 comprises:
S541: setting basic parameters of the algorithm, initiating positions and velocities of particles; introducing chaotic Sine mapping to build a non-linear stochastic ascending inertia weight, and the improved inertia weight is expressed as:

$$\begin{cases} \omega^k = S(k) \times \omega_{min} + (\omega_{max} - \omega_{min})\dfrac{k}{k_{max}} \\ S(k) = \mu \times \sin(S(k-1)\times\pi),\ S(0)=rand,\ \mu\in(0,1] \end{cases}$$

in the equation, k is the current iteration number; $k_{max}$ is the maximum iteration number, setting $k_{max}=200$; $\omega^k$, is a weight value at the kth iteration; $\omega_{max}$ and $\omega_{min}$ are an upper threshold and a lower threshold of the inertia weight, respectively 0.9 and 0.4; and S(k) is chaotic Sine mapping;

S542: calculating fitness values of the particles according to a given function $$F = E_{elc}^{RE} + E_{elc}^{TR} + E_{sub} - C_{tr} + E_{quota}$$

and storing individual optimal positions and global optimal positions;
subsequently, comparing the fitness values of all the particles in the swarm and the fitness values of the experienced optimal positions, if the former is better, replacing the experienced individual optimal position of the particles with the current positions of the particles;
S543: renewing the positions and the velocities of the particles, modifying the positions of the particles again according to the restraint conditions, calculating the fitness values of the particles, recording and renewing the individual optimal positions and global optimal positions;

$$v_{id}(t+1) = \omega^k v_{id}(t) + c_1 r_1 (pbest_{id} - x_{id}(t)) + c_2 r_2 (gbest_d - x_{id}(t))$$

$$x_{id}(t+1) = x_{id}(t) + v_{id}(t+1)$$

in the equation, $v_{id}(t+1)$ and $x_{id}(t+1)$ are respectively the velocities and positions of the particle I at the t+1 iteration; $c_1$ and $c_2$ are learning factors, $c_1=c_2=2$; $r_1$ and $r_2$ are random numbers distributed evenly in a range of [0, 1]; $\omega^k$ is a weight at the kth iteration; $pbest_{id}$ comprises extreme values of the current particle i; $gbest_d$ is a current global optimal solution; and $x_{id}$ is a position of the particle I at the tth iteration;
S544: repeating steps S541 to S543 until reaching the iteration number, the algorithm is converged, and solving is done;
wherein the benefits of the renewable energy power generating entities participating in the electricity market are represented as:

$$E_{elc}^{RE} = \sum_{t \in T} \sum_{i \in \Omega_r} \alpha_{elc,t} P_{e,sell,t}^{RE,i} \Delta t$$

the benefits of the traditional energy power generating entities in participating in the electricity market are represented as:

$$E_{elc}^{TR} = \sum_{t \in T} \sum_{i \in \Omega_t} \alpha_{elc,t} P_{e,sell,t}^{TR,i} \Delta t$$

in the foregoing equation, $$E_{elc}^{RE}$$

stands for the benefits of the renewable energy power generating entities by selling the electricity; $\Omega_r$ stands for renewable energy power generating units; $\alpha_{elc,t}$ is electricity market price;

$$P_{e,sell,t}^{RE,i}$$

is an output contributed by the electricity sold by a renewable energy power generating unit i at a time t; $\Delta t$ is an output time;

$$E_{elc}^{TR}$$

is a benefit of the renewable energy power generating entities by selling the electricity, $$P_{e,sell,t}^{TR,i}$$

is an output contributed by the electricity sold by a traditional energy power generating unit i at a time t; $\Omega_t$ is a traditional energy power generating unit; and T is a market transaction period;
the benefits of the renewable energy power generating entities in participating in the green certificate market are represented as:

$$L_{obt} = \sum_{t \in T} \sum_{i \in \Omega_r} P_{e,t}^{RE,i} \Delta t$$

$$E_{sub} = \sum_{i \in \Omega_r} \alpha_{GCER} L_{sell,i}$$

the expenses of the traditional energy power generating entities in participating the green certificate market are shown as:

$$C_{tr} = \sum_{i \in \Omega_r} \alpha_{GCER} L_{buy,i}$$

in the foregoing equation, $L_{obt}$ is a number of the green certificates obtained by the output of renewable energies;

$$P_{e,t}^{RE,i}$$

is an output power of the renewable energy power generating unit i at a time t; $E_{sub}$ is a benefit of the renewable energy power generating entities selling the green certificates; $\alpha_{GCER}$ is green certificate price; $L_{sell,i}$ is a number of the green certificates that the renewable energy power generating unit i sold; $C_{tr}$ is an expense of the traditional energy power generating entities in participating in the green certificate market; and $L_{buy,i}$ is a number of the green certificates those the traditional energy power generating entities buy.

2. The electricity-carbon-green certificate market transaction method based on chaotic mapping considering carbon capturing according to claim 1, wherein in the step S1, the market entities comprise renewable energy power generating entities, conventional energy power generating entities and users, wherein the users comprise power consumers and industrial users;
the transaction strategy comprises:
the renewable energy power generating entities sell electricity and green certificates; conventional energy power generating entities sell electricity and carbon quota, and buy the green certificates and the carbon quota; meanwhile, some carbon emissions are neutralized by carbon capturing; the power consumers buy electricity and the green certificates; and the industrial users buy the green certificates and the carbon quota;

wherein, the green certificates are used as the carbon quota to counteract the carbon emissions to realize low carbon transaction of the multi-element market.

\* \* \* \* \*